United States Patent Office 2,713,073
Patented July 12, 1955

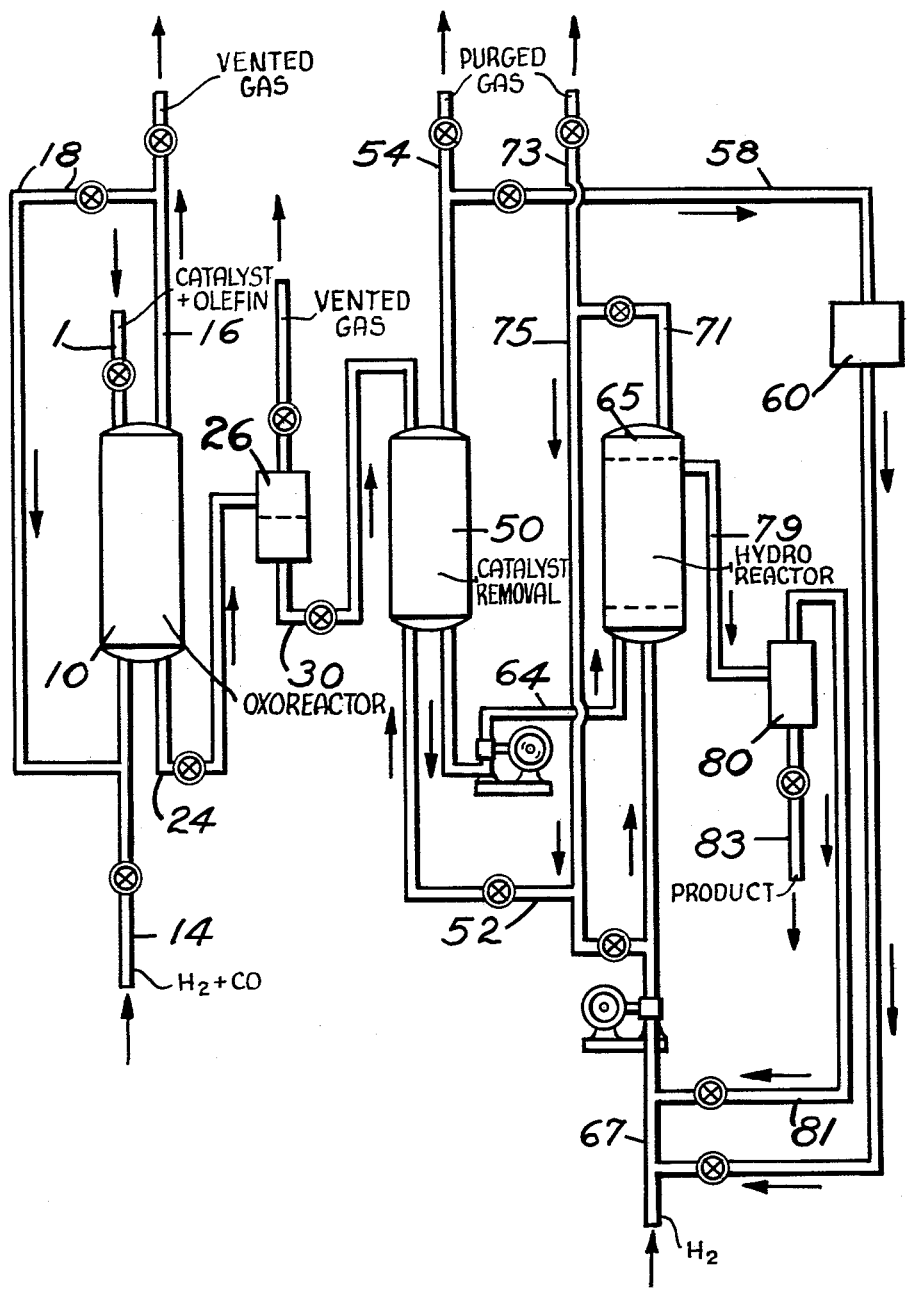

2,713,073

CATALYTIC HYDROGENATION OF OXO ALDEHYDES

Warren M. Smith, Baton Rouge, La., assignor to Esso Research and Engineering Company, a corporation of Delaware Application November 30, 1949, Serial No. 130,249

8 Claims. (Cl. 260—632)

The present invention relates to an improved synthesis process for the production of oxygenated organic compounds by reacting organic compounds having an olefinic double bond with gas mixtures containing carbon monoxide and hydrogen at high pressures and elevated temperatures in the presence of suitable catalysts followed by hydrogenation of the oxygenated products to convert carbonyl compounds formed into alcohols. More particularly, this invention is concerned with improvements of the hydrogenation stage of the process, by carrying out the hydrogenation in the presence of a sulfur-insensitive catalyst comprising phosphorus-promoted molybdenum sulfide supported on activated charcoal, under conditions conducive to substantially complete hydrogenation of carbonyl groups present.

The synthesis of oxygenated organic compounds from olefinic compounds and mixtures of CO and $H_2$ is well known in the art. The olefinic starting material is reacted in the liquid state with CO and $H_2$ in the presence of a metal catalyst, usually an iron group metal catalyst, such as a suitable cobalt compound to form, in a first stage, organic carbonyl compounds such as aldehydes, ketones and acids having one carbon atom more per molecule than the olefinic feed material. These carbonyl compounds are then usually hydrogenated in a second stage to produce the corresponding alcohols.

Practically all types of organic compounds having an olefinic double bond may be used as starting materials, including aliphatic olefins and diolefins, cyclo-olefins, aromatics with olefinic side chains, oxygenated compounds having olefinic double bonds, etc. The metal catalyst is preferably used in the form of a fatty acid salt soluble in the olefinic feed stock, such as the naphthenates, stearates, oleates, etc. of cobalt or iron. Suitable reaction conditions include temperatures of about 150°–450° F., pressures of about 100 to 300 atms., $H_2$:CO ratios of about 0.5–4.0:1, liquid feed rates of about 0.5–5 v./v./hr. and gas feed rates of about 1,000–45,000 standard cu. ft. of $H_2$+CO per barrel of liquid feed.

The hydrogenation stage may be operated at conventional hydrogenation conditions which include temperatures, pressures, gas and liquid feed rates approximately within the ranges specified above for the first stage. Conventional hydrogenation catalysts, such as nickel, tungsten, molybdenum, their oxides and sulfides and others may be used. The liquid product from the hydrogenation stage is worked up by distillation to separate the desired alcohols from unconverted olefinic feed material, unhydrogenated carbonyl compounds, and hydrocarbons formed in the process.

Serious difficulties have been encountered in the hydrogenation stage as a result of sulfur poisoning of the catalyst. The most readily available olefinic feed stocks for the oxygenation reaction have sulfur contents as high as 0.1% or even higher. This sulfur is carried through the oxygenation stage into the hydrogenation stage where it combines with the hydrogenation catalyst to reduce its activity unless sulfur insensitive catalysts are used. Extensive experimental work on the use of sulfur insensitive catalysts has shown that these catalysts either have unsatisfactory activity and/or selectivity to alcohol formation, or insufficient mechanical strength, or all of these undesirable properties.

High mechanical strength is of particular importance in commercial operation which involves the use of fixed catalyst beds of considerable height and weight to which the lower catalyst layers are subjected. In addition, the hydrogenation stage is a liquid phase operation in which the catalyst is subjected to the action of high velocity liquid streams which tend to disintegrate the catalyst, leading to channelling and plugging in the reactor and premature shut-down of the operation. The need for a sulfur insensitive catalyst of satisfactory strength, which may be used at conditions conducive to substantially complete conversion of aldehydes into alcohols, therefore, has been strongly felt in the alcohol synthesis art. The present invention fills this need.

Other objects and advantages of the invention will appear hereinafter.

In accordance with the present invention, the oxygenated product from the first stage of the synthesis is hydrogenated in the liquid phase in the presence of a hydrogenation catalyst consisting essentially of molybdenum sulfide supported on charcoal and promoted by the addition of a minor proportion, based on molybdenum, of $P_2O_5$ to the catalyst prior to its sulfidation. It has been found that this catalyst combines satisfactory mechanical strength with excellent activity and selectivity to alcohol formation. It is superior to other sulfur-insensitive hydrogenation catalysts suggested in the prior art for the liquid phase hydrogenation of sulfur-containing products of the oxygenation of olefinic organic compounds and appreciably superior to molybdenum sulfide-charcoal catalyst which is free of phosphorus. The concentration of $P_2O_5$ may be about 0.01–0.3% and is preferably maintained at about 0.03–0.1% by weight based on total catalyst.

The catalyst of the invention may be prepared by impregnating activated charcoal in the form of 4–8 mesh granules prepared from cocoanut shells with an aqueous solution of ammonium molybdate containing a minor proportion of $P_2O_5$ until the desired amounts of molybdenum salt and phosphorus compounds are absorbed. The impregnated charcoal may be dried, heated to about 200–400° F. and sulfided with a suitable sulfiding agent, such as hydrogen sulfide, carbon disulfide, or the like, to convert its molybdenum content to the sulfide form.

An alternative form of preparation involves dissolving molybdenum oxide and a minor proportion of $P_2O_5$ in a solution of ammonium sulfide, impregnating the charcoal with this solution and heating the impregnated charcoal to form molybdenum sulfide by decomposition on the carrier.

The hydrogenation conditions of pressure and rates of oxygenated product and hydrogen feeds useful for the purpose of the present invention are those normally employed in this type of operation. They depend to a certain extent on the character of the material to be hydrogenated and may include pressures of about 300 to 3500, preferably about 2500–3000 lbs. per sq. in., oxygenated product feed rates of about 0.2–1.0 volumes of liquid feed per volume of catalyst space per hour and hydrogen feed rates of about 3000–15,000 cu. ft. preferably about 5000–15,000 cu. ft. per barrel of liquid feed. The temperature may be maintained at about 400°–500° F., preferably 425°–500° F. While the invention is applicable to the hydrogenation of synthetic oxygenated compounds of a wide molecular weight range, the preferred starting materials for the hydrogenation stage of the invention are synthetic $C_8$ oxygenated compounds which have been found consistently to afford good results.

The process of the invention in all its stages may be carried out by conventional means in any suitable conventional equipment. The design and operation of such equipment will be briefly described hereinafter with reference to the accompanying drawing which illustrates schematically a suitable system of this type.

Referring now in detail to the drawing, a mixture of feed olefin and dissolved oxygenation catalyst may be supplied from line 1 under the desired pressure to oxygenation reactor 10. The olefins may be obtained from any conventional source. They may have a boiling range of about 150°–500° F., olefins containing about 6–8 carbon atoms per molecule being preferred.

The liquid olefins in reactor 10 which may contain about 0.05–0.5% or more of a catalytically active metal component, particularly cobalt, may be passed downwardly and countercurrently to synthesis gas supplied to the bottom of reactor 10 through line 14. The synthesis gas preferably has an $H_2:CO$ ratio of about 1 and is supplied in amounts substantially exceeding those theoretically required for the conversion of the olefins. Reactor 10 is preferably maintained at a temperature of about 250°–400° F. and a pressure of about 3000 lbs. per sq. in. Unconverted synthesis gas may be withdrawn overhead through line 16 to be vented or recycled through line 18 to reactor 10.

The liquid reaction product containing some dissolved or suspended gas is withdrawn through line 24 and passed to a gas-liquid separator 26 from which liquid product is withdrawn through line 30 and passed to a catalyst removal zone 50 which may be packed with an inert solid material, such as pumice, silica gel, alumina, etc. Hydrogen may be supplied to zone 50 through line 52. Zone 50 is preferably maintained at a temperature of about 200°–400° F. and at a pressure of about 100–500 lbs. per sq. in. at which the catalyst entering zone 50 mainly in the form of metal carbonyl is decomposed to metal and CO. The metal is deposited on the packing and the CO is purged by the hydrogen to leave through line 54. Any desired portion of this gas mixture may be passed through line 58 to a methanizer 60 wherein carbon monoxide in the gas may be converted to methane in any conventional manner.

The liquid oxygenated product now free of catalyst may be withdrawn from zone 50 through line 64 and passed to a lower portion of hydrogenation reactor 65. Simultaneously, hydrogen is supplied through line 67 in proportions at least sufficient to convert the aldehydes of the liquid feed into the corresponding alcohols. Reactor 65 contains a fixed bed of hydrogenation catalyst consisting of $P_2O_5$-promoted molybdenum sulfide on charcoal prepared as described above and containing about 6–15% of molybdenum calculated as $MoO_3$ and about 0.01–0.3% of phosphorus, calculated as $P_2O_5$. Suitable operating conditions for the preferred feed stock above referred to include pressures of about 2500–3000 lbs. per sq. in., temperatures of about 400°–500° F., liquid feed rates of about 0.3–1.0 v./v./hr. and hydrogen feed rates of about 6000–7000 standard cu. ft. per barrel of liquid feed.

Unreacted hydrogen may be withdrawn overhead from reactor 65 through line 71 and either vented through line 73 or recycled through line 75 via line 52 and/or line 67 to catalyst removal zone 50 and/or hydrogenation reactor 65. The hydrogenated product stream is withdrawn from reactor 65 through line 79 and may be passed to a separator 80 in which entrained gas may be separated from the liquid product. If desired, excess hydrogen and liquid product may be withdrawn together and separated in a separating drum similar to vessel 26. Hydrogen may be withdrawn through line 81 and recycled to reactor 65. Final hydrogenated product is recovered through line 83 to be passed to storage or any conventional product work-up system (not shown).

The invention and its advantages will be further illustrated by the following specific examples.

*Example I*

A $C_7$ olefin polymer was oxygenated with CO and $H_2$ in the conventional manner described above to obtain an oxygenated product having the following characteristics:

| | |
|---|---|
| Gravity, °API | 40.0 |
| Free carbonyl No | 149 |
| Hydroxyl No | 82 |
| Sulfur, parts per million | 11 |

This product was hydrogenated using two different sulfur insensitive catalysts at optimum hydrogenation conditions.

Catalyst No. 1 was prepared as follows:

⁹⁄₁₆″ extruded pellets of activated charcoal were soaked in a solution consisting of 62% 400 g./l. $MoO_3$
20% 29% $NH_4OH$
18% water for 1 hour. The excess solution was drained off and the catalyst dried in a steam oven at 250° F. The resulting catalyst contained about 9% molybdenum expressed as the oxide. Sulfiding was carried out in a hydrogenation reactor of the type of reactor 65 as follows. The dried catalyst was placed in the reactor and hydrogen was introduced while the pressure was allowed to build up to about 3000 p. s. i. g. and the temperature was raised to about 700° F. Thereafter one liquid volume per hour per catalyst volume of a solution of 1% $CS_2$ in n-heptane was passed through the reactor at the same conditions of temperature and pressure and at a hydrogen feed rate of about 6000 normal cu. ft. per barrel of liquid feed, with the effect that sulfidation took place in the vapor phase. The introduction of the sulfiding solution was continued for about 12 hours. Thereafter, the liquid feed was cut out, the temperature reduced to about 400° F. and the oxoaldehyde feed was cut in at a rate of 0.5 liquid volumes per volume of catalyst per hour, the temperature being allowed to rise to about 450° F. Instead of n-heptane, other paraffinic hydrocarbons having boiling points between about 150° and 500° F. may be used. The sulfidation time depends largely on the temperature employed and may lie anywhere between about 12 and 24 hours.

Catalyst No. 2 was prepared, activated and placed on stream in a manner similar to that used for catalyst No. 1 with the essential exception that the catalyst charged to the hydrogenation reactor contained about 0.01–0.02 mols of phosphorus as $P_2O_5$ per mol of molybdenum.

The conditions and results of hydrogenation runs carried out with these two catalysts are tabulated below.

| | Catalyst No. 1 | Catalyst No. 2 |
|---|---|---|
| | Sulfided $MoO_3$ on Activated Carbon | Sulfided $MoO_3+P_2O_5$ (152:1 mol ratio) on Activated Carbon |
| Catalyst Age, Days | 5 | 8 |
| Average Temp., °F | 449 | 444 |
| Feed Rate, v./v./hr | 0.5 | 0.5 |
| Pressure, p. s. i. g | 3,000 | 3,000 |
| Gas Rate, CF/B | 5,000 | 5,000 |
| Crude Alcohol Product: | | |
| Free Carbonyl No | 9 | 1.1 |
| Combined Carbonyl No | | 1.1 |

The above data demonstrate that the catalyst of the invention shows a substantially higher activity than a molybdenum sulfide-on-charcoal catalyst free of phosphorus. No difficulties due to catalyst disintegration have been encountered and the runs were voluntarily terminated. The selectivity of the catalyst of the invention toward desired product is likewise highly satisfactory as indicated in the following example.

*Example II*

The products obtained with catalyst Nos. 1 and 2 of Example I were analyzed to determine the selectivity of the catalyst toward the various hydrogenation products formed. The results were compared with a product obtained by a standard reference procedure believed to give maximum selectivity to alcohols in which the oxo-aldehyde of Example I was hydrogenated in a bomb using a catalyst consisting of nickel on a siliceous support with hydrogen at a temperature of 350° F. and a pressure of 3000 p. s. i. g. The results of this comparison are tabulated below.

| Selectivity, Mol. Percent | Reference Catalyst | Catalyst No. 1 | Catalyst No. 2 |
| --- | --- | --- | --- |
| to Hydrocarbons | 1 | 5 | 2 |
| to Aldehyde | 3 | 2 | 1 |
| to Alcohol | 69 | 72 | 73 |
| to Bottoms | 27 | 21 | 24 |

The above data demonstrate that the catalyst of the invention which has been shown in Example I to be superior in activity to a conventional sulfur and disintegration resistant catalyst, exhibits this improved activity without detriment to its selectivity to the desired alcohol.

The above demonstrated beneficial characteristics of the catalysts of the invention may also be utilized to great advantage in the hydrogenation of sulfur-free oxygenated product.

While the foregoing description and exemplary operations have served to illustrate specific applications and results, the invention is not limited thereto. Other modifications may appear to those skilled in the art without deviating from the spirit of the invention.

What is claimed is:

1. In the production of alcohols by reacting olefins with CO and $H_2$ in an oxygenation stage at elevated temperatures and high pressures in the presence of an oxygenation catalyst, hydrogenating the oxygenated product in a hydrogenation zone in the presence of a hydrogenation catalyst and at liquid phase hydrogenation conditions of temperature and pressure conducive to the conversion of carbonyl compounds into alcohols, and recovering hydrogenated product rich in alcohols, the improvement which comprises carrying out said hydrogenation in the presence of a catalyst consisting essentially of a major proportion of charcoal supporting a minor proportion of molybdenum sulfide promoted with a minor proportion, based on molybdenum sulfide, of combined phosphorus.

2. The process of claim 1 in which said oxygenated product contains sulfur.

3. The process of claim 1 in which said hydrogenation temperature is about 400°–500° F., and said hydrogenation pressure is about 2500 to 3000 pounds per square inch.

4. The process of claim 1 in which said catalyst contains about 5–15% by weight of molybdenum calculated as $MoO_3$ and about 0.01 to 0.3 weight per cent of phosphorus calculated as $P_2O_5$.

5. The process of claim 1 in which said hydrogenation conditions include a temperature of about 400°–500° F., a pressure of about 2500–3000 lbs. per sq. in., an oxygenated product feed rate of about 0.3–1.0 liquid volumes per volume of catalyst space per hour, and hydrogen feed rates of about 5000–15000 standard cu. ft. per barrel of liquid feed.

6. The process of claim 1 in which said catalyst is prepared by impregnating charcoal pellets with an ammonium molybdate solution containing $P_2O_5$, drying the impregnated pellets and sulfiding the dry product in a stream of a gaseous sulfiding agent at a temperature of about 700° F. in the presence of hydrogen under a pressure of about 3000 lbs. p. s. i. g.

7. The process of claim 6 in which said sulfiding agent is a vaporized solution of $CS_2$ in a paraffinic hydrocarbon having a normal boiling point between 150° and 500° F.

8. The process of claim 7 in which said catalyst is sulfided in said hydrogenation zone prior to starting said hydrogenation.

References Cited in the file of this patent

UNITED STATES PATENTS

| 1,975,476 | Pier et al. | Oct. 2, 1934 |
| 2,500,210 | Schexnaidler | Mar. 24, 1950 |
| 2,544,271 | Liedholm et al. | Mar. 6, 1951 |
| 2,604,491 | Hale | July 22, 1952 |

OTHER REFERENCES

Technical Oil Mission Reel 36 (PB 85771 abstracted at page 29), taken from Reel (released by O. T. S. November 1946).

I. G. Farben German Pat. Application I 72 947 IV d/120 (English translation in "Oxo Process" By Chas. A. Meyer Co., Nyack, N. Y. (1948) pp. 45–46).